(12) United States Patent
Gore

(10) Patent No.: US 6,251,286 B1
(45) Date of Patent: Jun. 26, 2001

(54) ACCUMULATING AUTOMATIC SKIMMER

(75) Inventor: Douglas J. Gore, Pleasant Hill, CA (US)

(73) Assignee: Douglas Engineering div.U.S. Hydrex Inc., CA (US)

( * ) Notice: Subject to any disclaimer, the term of this patent is extended or adjusted under 35 U.S.C. 154(b) by 0 days.

(21) Appl. No.: 09/358,835

(22) Filed: Jul. 22, 1999

Related U.S. Application Data

(60) Provisional application No. 60/093,663, filed on Jul. 22, 1998.

(51) Int. Cl.[7] .............................. C02F 1/40; E02B 15/00
(52) U.S. Cl. ......................... 210/744; 210/776; 210/86; 210/104; 210/123; 210/143; 210/242.3; 210/923
(58) Field of Search .............................. 210/143, 85, 86, 210/97, 104, 169, 242.1, 242.3, 121, 123, 776, 923, 740, 744, 170, 747, 115; 405/60, 63

(56) References Cited

U.S. PATENT DOCUMENTS

| | | |
|---|---|---|
| 3,970,556 | 7/1976 | Gore . |
| 4,554,070 * | 11/1985 | Jordan . |
| 5,108,591 * | 4/1992 | Hagan . |
| 5,231,938 | 8/1993 | Gore . |
| 5,308,510 | 5/1994 | Gore . |
| 5,478,483 | 12/1995 | Gore . |
| 5,484,522 * | 1/1996 | Entrekin . |
| 5,569,372 * | 10/1996 | Smith . |
| 5,948,266 | 9/1999 | Gore . |
| 6,027,641 * | 2/2000 | Spradbury et al. . |

\* cited by examiner

Primary Examiner—Joseph W. Drodge
Assistant Examiner—Terry K. Cecil
(74) Attorney, Agent, or Firm—Thomas M. Freiburger

(57) ABSTRACT

A floating skimmer is used for automatically removing oil and other floating matter from the surface of liquid surrounding the skimmer, preferably in a basin or sump. Floats around the periphery and above the general body of the skimmer provide flotation while the unit is at rest. Two liquid removal devices are provided, one to remove the most dense liquid (generally oil) accumulated in the skimmer sump. A gasketed, hinged, floating weir rests on the fluid level in the skimmer sump and when liquid is removed from the sump by either the first or second device or a combination of both, the weir falls back, creating a cascade action which attracts the surface of surrounding liquid into the skimmer sump. Instrumentation is included to provide information for automatic operation and status reporting of the skimmer.

22 Claims, 9 Drawing Sheets

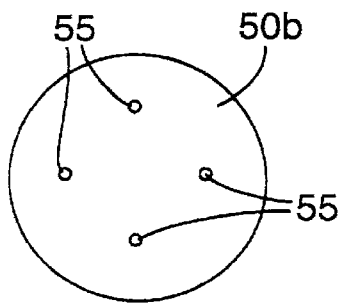
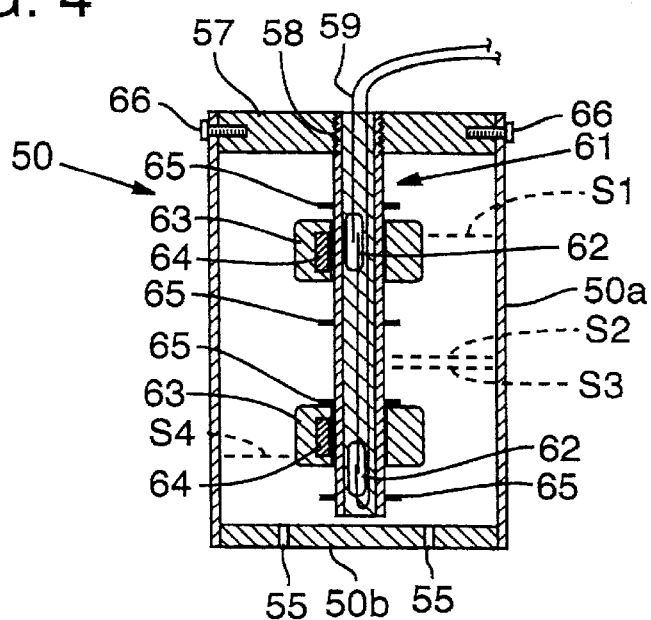
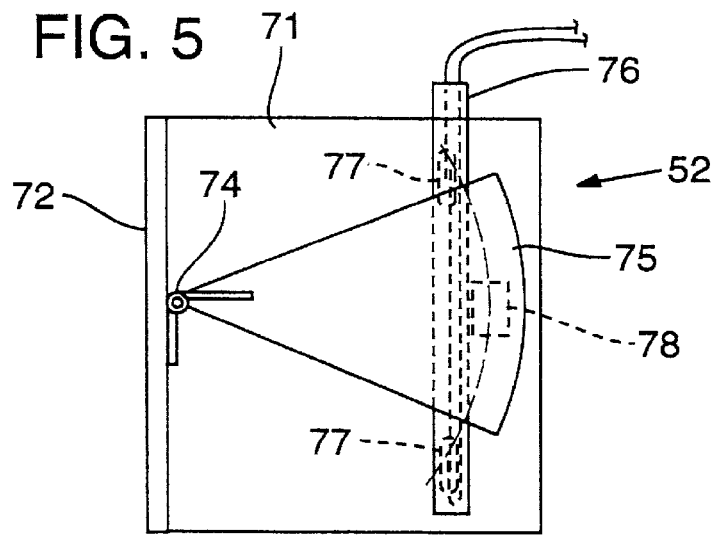
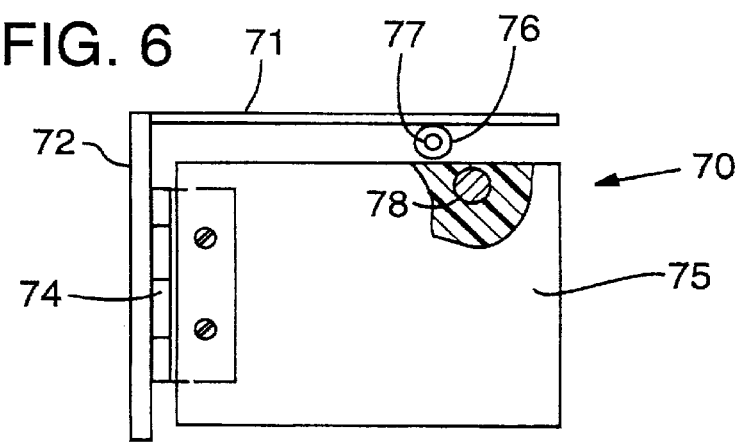

ACCUMULATING AUTOMATIC SKIMMER

BACKGROUND OF THE INVENTION

This application was filed Jul. 22, 1998 as a provisional application Ser. No. 60/093,663.

This invention relates to a method and apparatus for cleaning the surface of liquid in a reliable and automated manner.

Many industrial, military and municipal facilities have separation tanks, sumps, lift stations and the like which must have oil or other floating material removed from the surface of the water in these facilities. In general, these tanks and sumps are not hospitable to human observation and consequently, they are not easily cleaned by standard methods. This invention provides a means for accurate reporting of the skimmer related conditions in such tanks and sumps, the control of debris, and the removal of oil accumulations.

Skimmers described in the prior art either deliver an oil and water output which must be separated by an expensive process or require the movement of physical means into the liquid layer to adsorb the oil, a process which is difficult to maintain and often provides unreliable performance. This invention attracts and collects floating oil and debris, stores the debris, and pumps the collected oil to surface collection tanks without underlying water.

SUMMARY OF THE PRESENT INVENTION

It is an important objective of this present invention to combine the attraction characteristics of a weir skimmer and the selectivity of a mechanical skimmer with automatic controls and status signals which provide automatic pure oil recovery in environments where human intervention is not appropriate. One important example of the invention's use is in a basin or sump that collects water (such as rain or wash water) and oil (such as automotive oils or fuels) from a parking lot or a roadway.

In one embodiment of the present invention the skimmer comprises a relatively large sump with flotation tanks, with a lower liquid removal means, an upper liquid removal means, a floating articulated weir for liquid input, a debris screen to keep out larger floating debris and a debris basket to accumulate smaller debris, and related instrumentation and level sensors, with associated logic controls to direct skimmer operations and to report skimmer status.

The logic control will recognize a "start cycle" signal such as a manual switch closure, the passage or arrival of a time event, or the recognition of an event such as a water level in a sump rising. Upon receipt of this signal, the logic unit will turn on the lower liquid removal means (water pump) which will start a skim over the floating weir which controls liquid input into the skimmer body and creates a cascade action that attracts floating material into the skimmer.

The nature of the floating weir is to create a void space behind the weir which has a tendency to cause the body of the skimmer to rise out of the water. As the skimmer rises, the floats are elevated and displacement is lost; ultimately, an equilibrium is established between the rise of the skimmer and the loss of displacement. This change in elevation in relation to the external water level is measured by instrumentation (float switch or ultrasonic level indicator for instance) and logged into the logic controls, thus allowing an accurate reporting of the skim status of the skimmer. If the external water level fails to reach the prescribed level, the logic unit can take corrective steps. In this preferred embodiment, the logic unit will shut down any pumps which are on and allow the system to remain dormant for a period of time; it will then resume the pumping. This procedure may be repeated several times before the skimmer pumps are shut down and an error condition is reported. The assumption behind this type of action is that any correctable problem is due to debris somehow lodging into the moving parts of the skimmer and cessation and resumption of skimming can often clear these problems. It has been observed that particularly viscous oils can prevent liquid from entering the skimmer, but cessation and resumption can overcome this problem.

During the skimming operation, surface liquid is drawn into the skimmer; the external debris screen bars larger debris such as beverage cans from entering the skimmer. A secondary debris basket collects the smaller debris which enters. This secondary debris basket is removable for easy cleaning. Oil accumulates in the upper area of the skimmer sump and is monitored by a specific gravity sensitive switch or other appropriate measurement device to determine when the accumulation of lighter specific gravity liquid (generally oil) is sufficient to activate a pump which has an intake orifice generally in the mid-depth of the accumulation of the light liquid, and which removes the lighter specific gravity liquid. The pump operation is terminated when the specific gravity switch is turned off by the detection of the removal of the lighter specific gravity fluid (or removal to a certain degree).

A low liquid level switch (or other appropriate level sensor) monitors the fluid level inside the skimmer sump. Should this switch indicate that the level of liquid in the skimmer sump is too low, the situation is reported to the control module. Upon receipt of this signal, the control unit may take corrective action. In one embodiment of this invention, the control will shut off any of the pumps which are on. The control will keep the skimmer pumps dormant for a period of time and then resume the pumping; if the signal is cleared, operation can continue as normal. If not, the skimmer will be shut down and an error condition will be indicated. The dormant cycle can be repeated several times before the error condition is indicated and the skimmer is shut down. Generally such a low-liquid condition would be caused by insufficient liquid entering the skimmer, over the weir. This could be from a blockage, or possibly from a problem with the weir itself, where it fails to admit outside liquid.

Because the present invention allows for the accurate presentation of the status of the skimmer and the liquid inside it, the logic controls can direct the operation of the skimmer to suit the needs of the situation. In one embodiment, the logic controls monitor a fluid level switch which measures the level of the liquid in an oil recovery tank which accepts the oil output of the skimmer. The logic controls can therefore suspend oil recovery and signal a "recovery tank full" condition. The logic controls may also determine if oil recovery has occurred over a period of time (example, eight hours of skimming) and if no such oil recovery has occurred, the skimmer can be shut down until the next "start cycle" event occurs.

It is thus an object of the invention to provide automatic operation in separation of two different-density liquids, preferably petroleum derivative and water, with reliable operation, in a situation where human observation and operation are inconvenient or difficult.

These and other objects, advantages and features of the invention will be apparent from the following description of a preferred embodiment, considered along with the accompanying drawings.

DESCRIPTION OF THE DRAWINGS

FIG. 3 is a bottom view showing an instrument well of the system.

FIG. 4 is a side view, schematic and in section, showing the instrument well.

FIG. 5 is a schematic view indicating the construction of a specific gravity switch.

FIG. 6 is a schematic plan view of the switch of FIG. 5.

DESCRIPTION OF PREFERRED EMBODIMENTS

Figure 1:
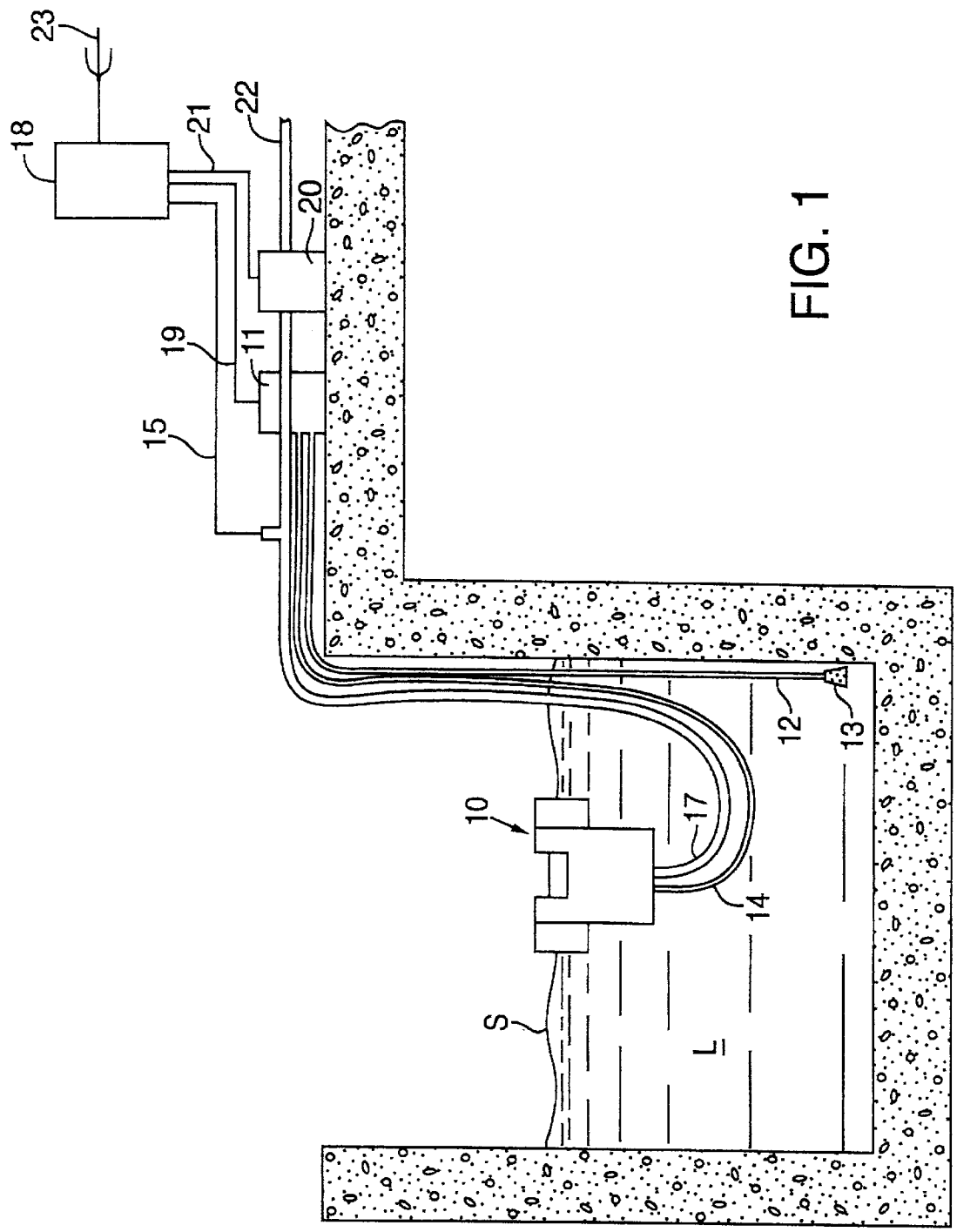
FIG. 1 is a schematic view in side elevation showing a system according to the invention.

As best illustrated in FIG. 1, a floating skimmer 10 is constructed to skim the surface S of a liquid L, accumulating the skimmed material for removal. In one of several possible arrangements, a water pump 11 takes input via a conduit 12 which may have a screen 13 attached to prohibit debris from entering the conduit and thus interfering with the pump 11. The output of pump 11 is directed via a conduit 14 to a venturi type pump (as described below) in the body of skimmer 10. This establishes the skim of the surface S of the liquid L. Electrical signals or the equivalent such as light or air pressure are transferred from skimmer instrumentation (as described below) via a conduit 15 which runs through an oil hose 17 to control circuitry 18. In consideration of explosive environments associated with volatile vapors from surface S, all signals in the conduit 15 should be intrinsically safe as defined by the National Electric Code.

The control circuitry 18 controls the water pump 11 via a conduit 19, and controls the oil off-load pump 20 via a conduit 21 (references to oil herein are intended to refer to any petroleum derivative). The oil off-load pump 20 takes input from oil hose 17 which pumps collected oil from the skimmer 10 (as described below) and discharges the oil through an oil output hose 22 to a suitable oil collection tank (not shown). All functions of the skimmer are under control of the control circuitry 18 which receives and analyzes conditions in the skimmer as reported by the instrumentation described below, and also directs skimmer operations by including other information received via a multiple conduit 23 which may include a signal that the oil collection tank is full, the status of on or off switches, time or date, or other information which would be suitable for input to the control circuitry. The control circuitry may also report different skimmer statuses via conduit 23 including error conditions, performance statistics, or confirmation of proper functioning. The control circuitry 18 also gets power from the multiple conduit 23.

Figure 2:
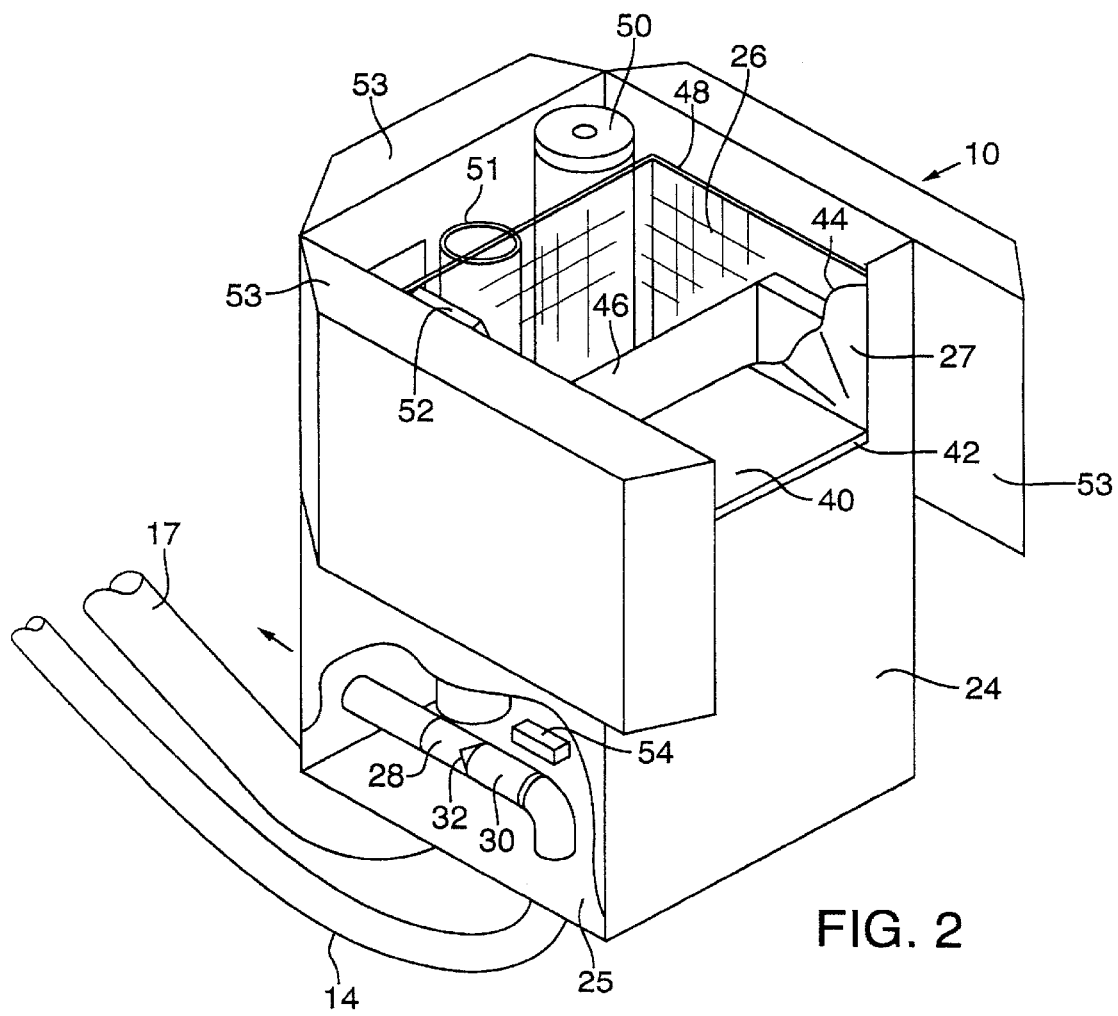
FIG. 2 is a schematic perspective view, partially broken away, showing a floating skimmer comprising a part of the system.

As best illustrated in FIG. 2 the floating skimmer 10 comprises an outer body 24 which defines the sides, and a bottom 25 thus defining an inner generally centrally-disposed cavity 26. The outer body has an opening 27 in one peripheral part for admitting liquid into the central cavity 26.

A drain opening 28 is formed in the lower portion of the body 24 for draining liquid from the central cavity 24 under control of a venturi pump 30. As noted above, liquid under pressure is supplied to the venturi nozzle 32 from a pump (FIG. 1) via hose conduit 14.

A movable weir 40 extends across the opening 27 and controls the quantity and velocity of liquid which can flow through the opening into the central cavity 26. The weir 40 is attached to the outer body 24 by a hinge mechanism 42 which allows the weir to articulate and swing up and down about the generally horizontally extending axis of the hinge 42. A petroleum resistant fabric 44 extends from the sides of the weir 40 to the sides of the opening 27 and prevents liquid from spilling over the sides of the weir 40, and also prevents liquid from draining out of the central cavity 26 into the surrounding liquid L. The fabric 44 must be flexible enough to allow the weir to move without interference.

A baffle 46 extends behind, below, and on the two sides of weir 40 so as to reduce the velocity of the liquid as it flows off the weir. This assists in "stilling" the liquid in the central cavity 26 so that the surface material (generally oil) accumulates at the upper part of the baffle 46 rather than being carried to the output 28. A rigid screen material 48 formed into a basket is placed in the central cavity 26 to capture small debris which may enter the skimmer with the liquid being skimmed. The debris basket 48 is sized so as to leave room for other operating parts of the skimmer.

An encasement 50 extends from the top of the central cavity 26 to a point near, but not touching the bottom 25 of the central cavity. Holes in the bottom of encasement 50 allow water to enter the encasement, thus providing a relatively oil free environment for float switches to operate freely in order to reflect the level of liquids in the central cavity 26. Thus encasement 50 forms an "instrument well" which provides a relatively calm and oil-free area wherein instrumentation may be placed to reflect the fluid levels inside of the central cavity.

An oil drain conduit 51 extends from slightly below the liquid level in the central cavity 26, during the operation of both the water pump (30 or equivalent) and the oil withdraw pump (FIG. 1), through the floor 25 of the central cavity to communicate with the oil withdraw hose 17. When activated, the oil pump will remove the accumulation of surface material via the conduit/drain 51.

Material with a defined specific gravity (generally SG 0.95), hinged at one end, forms an interface float 52. This float will sink in the lighter fluids collected in the central cavity 26 and will float on the water layer (specific gravity 1 for fresh water, 1.05 for salt water). Float 52 will signal the depth of the accumulated light material in the central cavity (generally oil).

The floating skimmer 10 is supported in the water by three floats 53. The floats 53 contemplated by FIG. 2 are hollow stainless steel tanks, filled with air. Other suitable flotation devices such as foam, or lighter than water material such as wood, would be acceptable. Size and positioning of floats is such that the central cavity defining material 24 and 25, and other components in the skimmer system 40, 27, 50, 51, 52, 48 and any other necessary components will float on water, at rest, with an appropriate freeboard. The configuration in FIG. 2 contemplates a 3-inch freeboard.

Dense material such as steel or lead may be used as ballast 54 in order to compensate for any over-buoyancy of floats 53.

FIGS. 3 and 4 further illustrate the instrument well 50. The instrument well is comprised of an outer casing 50a which is attached to a bottom plate 50b. Small holes 55 in the bottom plate 50b provide a conduit for the liquid inside the instrument well to equalize with the liquid in the central cavity 26 while substantially barring the entry of any stray oil into the chamber because of their small size. In order for stray or random droplets of oil to enter the chamber, they must be positioned virtually at the hole during a time when the liquid level in the sump is rising in relation to the liquid in the instrument well. The instrument well is further comprised of a cap 57 which provides attachment means 58 for the instrumentation in the well and a conduit 59 for wires or fiber optic cables to transfer information from the instrumentation in the well to a control means (FIG. 1).

For illustration of one type of instrumentation which can be used, FIG. 4 illustrates a double magnetic float switch arrangement where in a stem 61 which has threads to match attachment means 58 contains two hermetically sealed reed switches 62 which change states from open to closed, closed to open, depending on the proximity of magnets 64, attached to floats 63 which will move up and down within the limits of retaining clips 65 as the liquid level in the instrument well rises and falls. Generally, the instrument stem 61 is closed at the bottom and filled with a "potting compound" which renders it air and liquid tight. The instrument well cap 57 is either loosely attached and held in with a retainer means such as retainer screw 66, or is otherwise suitably vented in order to allow air to escape or enter as it must displace fluid exiting through holes 55 or be displaced by said fluid.

Vertical positioning of the instrument well 50 and thus the instruments inside are relative, based on the surface S of the body of liquid L in FIG. 1. Preferred placement is that the upper float 63 "closes" the upper reed switch 62 approximately ½ inch below the surface of the water $S_1$ in the instrument well 50 as the liquid level rises in the well. $S_1$ is defined as the surface of the liquid in the instrument well 50 at its highest point which will be substantially equal to the height of the surface S of the surrounding liquid L. $S_1$ will be achieved while the skimmer 10 is "at rest", that is, no pumps are operational. Drain 28 will allow the liquid inside the central cavity 26 to equalize with the surface S of the surrounding liquid L, and the holes 55 in the bottom of the instrumentation well 50 will allow equalization of the surface inside the central cavity with the surface of the liquid in the instrumentation well $S_1$. Equalization of the liquid surfaces is based on the relative weights of the liquid columns and may not be equal in elevation due to differing amounts of oil on any of the columns. This will not interfere with proper functioning. Lower float and reed switch 62 should be located a few inches below the lowest expected liquid level $S_2$ in the instrument tube defined by the simultaneous pumping action of both the oil and water pumps.

FIG. 4 illustrates magnetic reed switches 62 as instrumentation for level detection, but other methods such as, but not limited to, electrical conductivity, optics or sonic detectors are equally suitable. The instrumentation herein illustrated can supply information about the liquid level in the instrumentation well.

FIG. 5 illustrates the specific gravity switch 52 in elevation. The back face 72 of a mounting plate 71 provides a base for a hinge arrangement 74 which allow a mass of predetermined specific gravity material 75 to act as a float and swing up and down perpendicular to the axis of hinge 74. The specific gravity of the float 75 is such that it will sink in oil, but float on water, so that it will float on an oil-water interface. One preferred material is UHMWPE (Ultra High Molecular Weight Poly-Ethylene) which has a specific gravity of 0.97. Mounting plate 71 provides a base for attaching a tube containing reed switches 77 with appropriate wires which exit from the top of the tube to the control function. A magnet 78 embedded in the float 75 is positioned so that it will change the state of the upper reed switch 77 as the float 75 approaches the high end of the swing, and also will change the state of the lower reed switch 97 as the float 75 approaches the low end of the swing.

FIG. 6 shows a plan view of the switch 52. The back plate 71 is mounted on the rear wall of the central cavity 26 (rear being defined as opposite to the weir opening 27), which allows a relatively large mass of float material to generate enough negative or positive buoyancy to overcome sticky or thick oils. The structure of the mounting plate 71, and the back face 72 of the mounting plate, provide the proper orientation for the embedded magnet 78 to influence reed switches 77 as it reaches either the upper or lower reaches the float 75's swing.

FIGS. 5 and 6 illustrate the magnetic reed switches as instrumentation for level detection, but other methods such as, but not limited to, electrical conductivity, optics or sonic detectors are equally suitable. The instrumentation herein illustrated can supply information about the depth of floating material collected from the surface S (see FIG. 7) of the surrounding liquid L (see FIG. 1).

Figure 7:
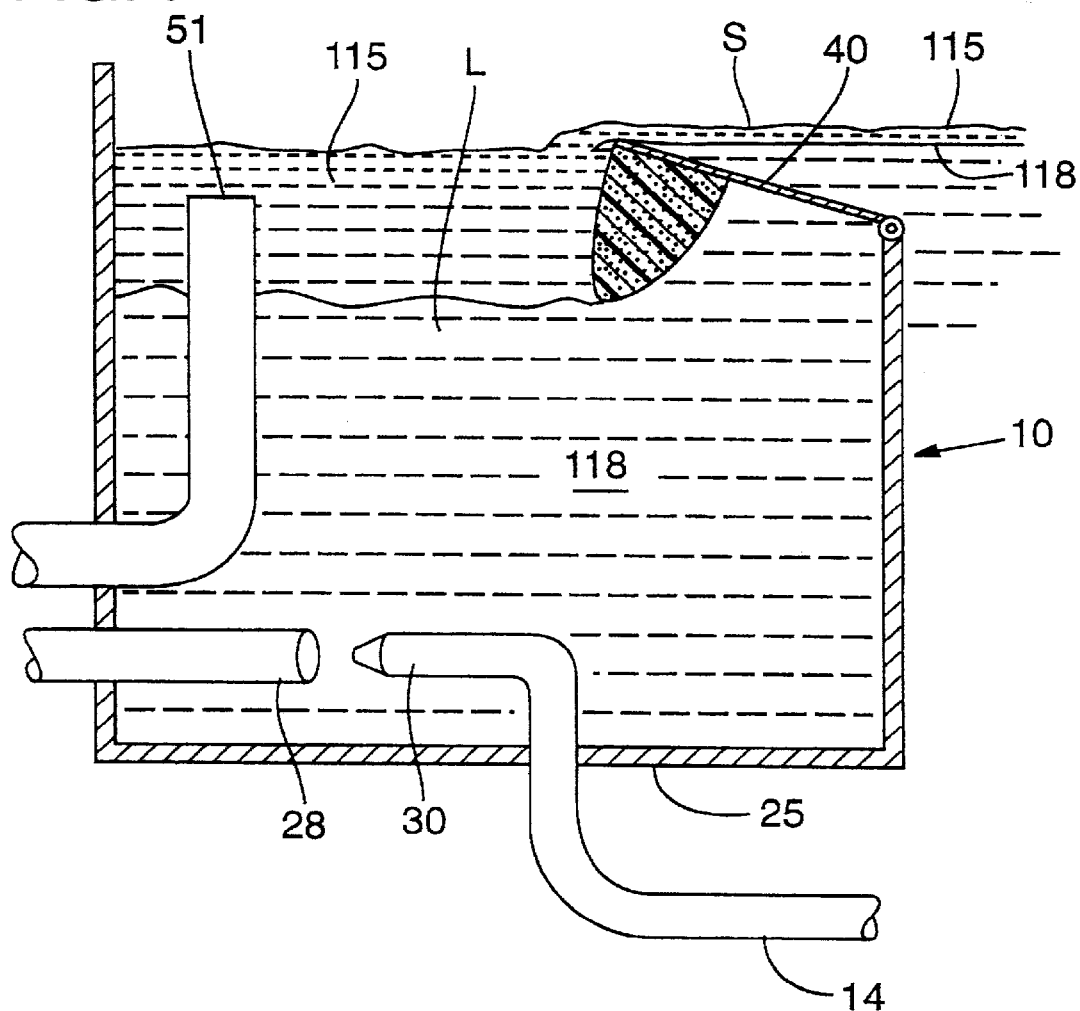
FIG. 7 is a conceptual view in side elevation indicating a principle evaporation of the skimmer.

FIG. 7 illustrates in a conceptual manner the accumulation of light material 115 (usually oil) from the body of liquid L. As the venturi pump 30 is activated from fluid under pressure from conduit 14, water 118 is drawn out of the central cavity 26 of the skimmer 10. This causes liquid and surface liquid to flow into the central cavity over the floating weir 40. Because of the comparatively large area of the central cavity, the oil and water flowing over weir 40 tend to maintain separation, therefore the lighter surface elements (generally oil) tend to accumulate at the upper portion of the central cavity, while the water migrates down to be discharged through the drain 28, due to the effect of the venturi pump 30. This action consolidates the lighter material gathered from the surrounding liquid L at the upper portion of central cavity 26, and thus appropriate instrumentation as depicted in FIGS. 4, 5 and 6 can signal to the controls to start and stop the oil removal pump at the appropriate times. The oil pump can then remove the accumulation of lighter materials through the oil drain conduit and hose 51, 17. As the oil is withdrawn, water comes up into the sump from the water outlet and venturi opening 28, since the venturi pump has been shut off for the oil pumping operation. The oil layer is pushed up in the sump and the oil is drawn off, pushed up and over the oil intake 51.

Figure 8:
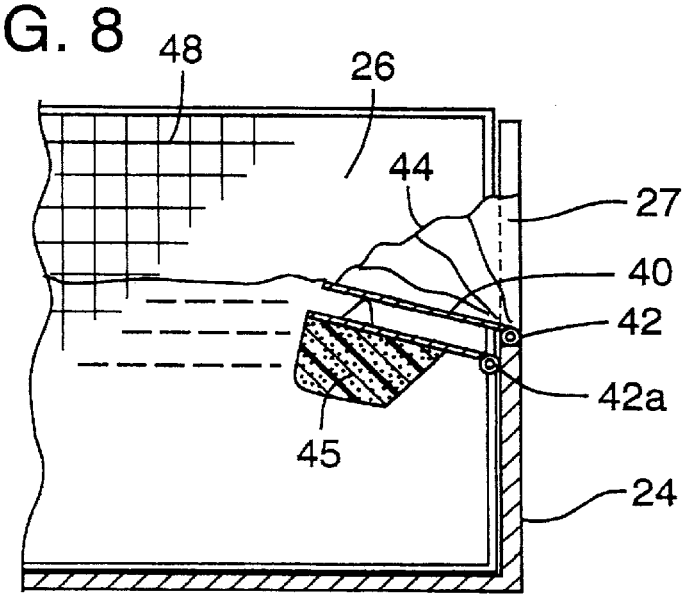
FIG. 8 is a schematic elevation view indicating operation of a floating weir of the system.

FIG. 8 illustrates the floating weir which transverses the opening 27 of the central cavity 26. Other parts of the skimmer 10 are eliminated for clarity. Weir plate 40 is attached by a hinge mechanism 42 to the front wall of skimmer outer body 24 ("front" being defined as the wall with the opening 27), thus being able to articulate up and down in a generally perpendicular range to the hinge mechanism 42. The weir plate 40 is also connected to the sides of the opening 27 by the flexible fabric gasket 44. The weir plate 40 is supported by the weir float 45 which is connected to the debris basket 48 by a hinge mechanism 42a similar to the weir hinge 42. The weir plate 40 and the weir float 45 could be integrated as one part with a single hinge 42, but having separate hinge mechanisms makes it easier to remove the debris basket 48 as only weir plate 40 need be pushed forward to facilitate removal of the basket.

Figure 9:
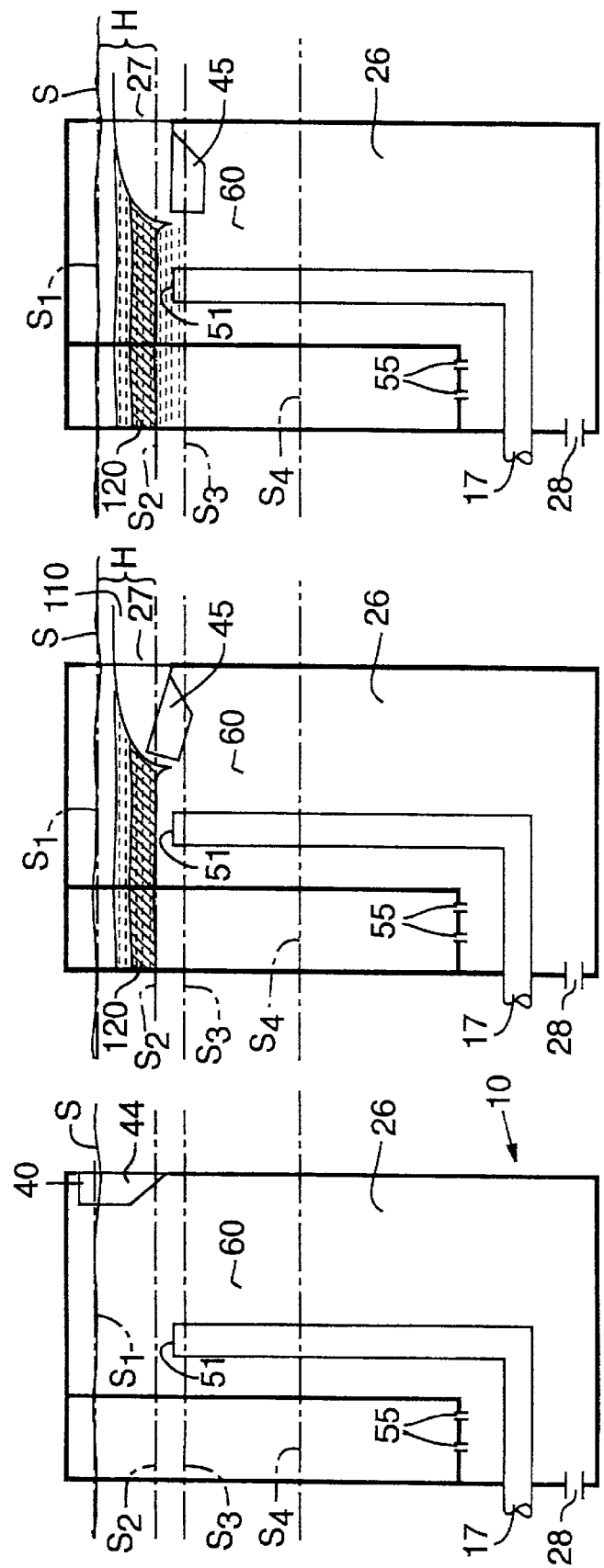
FIGS. 9A, 9B and 9C are schematic elevation views conceptually illustrating dynamics of the floating weir as related to the surface of surrounding liquid and other factors.

FIGS. 9A, 9B and 9C are representational models of the dynamics of the effects of the floating weir, the size of the weir float, and the effect of the pumps on the fluid levels in the central cavity 26 of the skimmer 10 as they relate to the surface S of the surrounding liquid L as depicted in FIG. 1.

As shown in FIG. 9A, when there is no pumping action on the skimmer, the fluid level inside the central cavity 26 reflects the level of the surface liquid S outside the skimmer 10 due to the exterior communication of the drain 28 and presence of holes 55, and this liquid level in the skimmer is referred to as $S_1$. The floating weir 40 and the gasket 44 effectively seal the central cavity 26 from the outside liquid L.

As shown in FIG. 9B, when fluid is forced out of the skimmer via the venturi pump acting on drain means 28, weir 40 falls back on the support of float 45. The ensuing liquid flow may be described by the following formula: $Q=KLH^{2/3}$, wherein Q is the quantity being removed from the skimmer via drain 28, K is a constant representing the characteristics of the liquid coming into the skimmer via opening 27, L is the length of the weir as determined by the width of opening 27, and H is the pressure head defined as the differential between the surface of the surrounding liquid S, and the tip of weir 40 (tip being defined as the downstream side). The resultant effect of this flow is that the liquid level in the central cavity 26 will drop by the height of H plus residual positive buoyancy in the weir float 45 in relation to the surface of the outer liquid S thus achieving $S_2$. A void space 120 will form which will cause the skimmer 10 to rise slightly out of the water; this has the effect of "deepening" the level of $S_2$ in relation to the skimmer and thus to the instruments used to measure this differential.

As shown in FIG. 9C when the pump demand of the oil pump via oil withdrawal hose 17 and via oil drain conduit 51 is added to the water pump demand depicted in FIG. 9B, H will increase and consequently the fluid level in the central cavity 26 will drop at a 2/3 exponential ratio, less the amount of reserve buoyancy of the weir float 45 which will be taken in supporting the additional weight of a greater H thus establishing level $S_3$ in the central cavity 26.

The levels $S_1$, $S_2$, and $S_3$ may easily be established empirically and then the desired instrumentation can report either the achievement of these levels or the failure to achieve these levels. Note that the instrumentation depicted in FIG. 4 would have the upper float 63 indicating the level $S_1$ and $S_2$, but not indicating a change between $S_2$ and $S_3$, while the lower float would indicate a theoretical level $S_4$ which would be consistent with an out of control situation wherein the pump or pumps were emptying the central cavity 26, faster than the weir could replace the liquid. This information can be used by the control function to signal an error, or to cause the skimmer to take corrective action.

Figure 10:
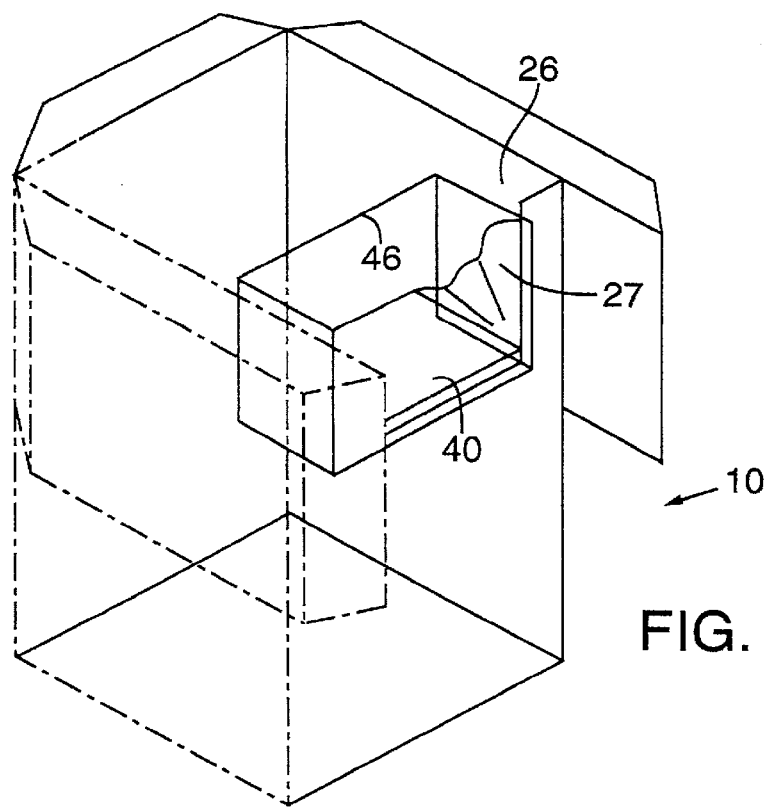
FIG. 10 is a schematic view in perspective, partially broken away, illustrating a baffle in the skimmer of the system.

FIG. 10 illustrates the baffle 46, which assists in changing the super or hyper-critical flow coming off the weir 40 to a subcritical, or relatively still flow. This allows the lighter portions of the surrounding liquid L to remain at the surface of the central cavity 26 to accumulate and subsequently be removed. The baffle 46 does not completely block inflow of surface liquid, since it does not extend to the front of the skimmer, allowing liquid to flow around it and into the sump area.

Figure 11:
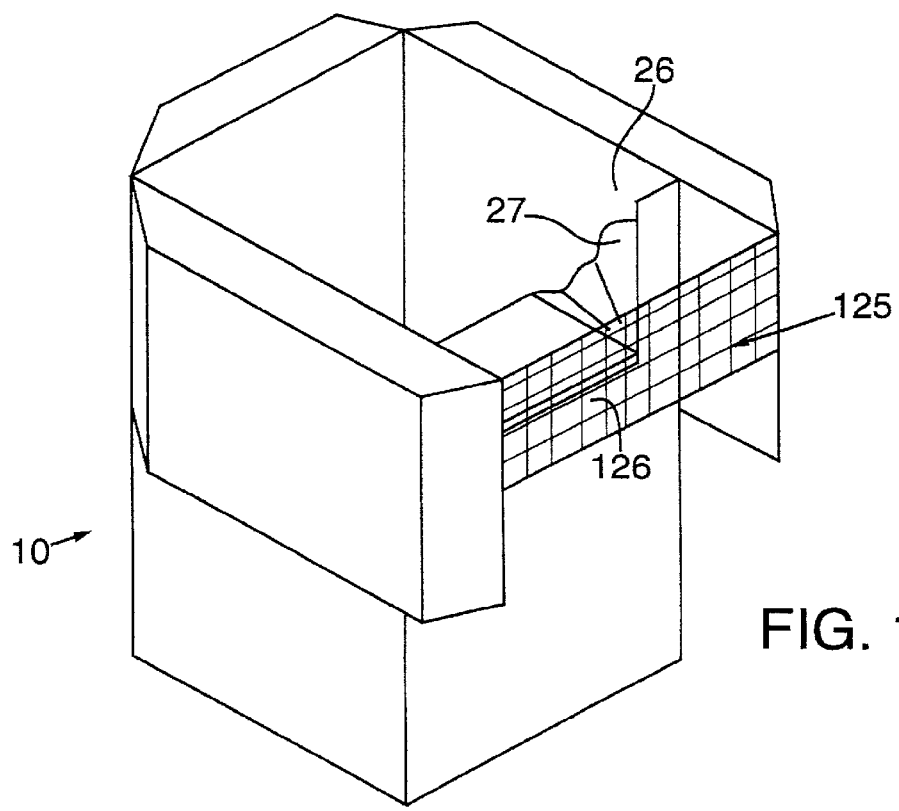
FIG. 11 is a view similar to FIG. 10, showing a screen used at the entrance to the skimmer.

FIG. 11 illustrates the placement of a screen 125 of suitable size and strength so as to prevent the entrance of larger debris (beverage cans, logs and the like) from entering the skimmer opening 27. A horizontal "window" 126 cut into the screen material will allow for the easy passage of oil into the skimmer while still blocking larger debris matter.

Figure 12:
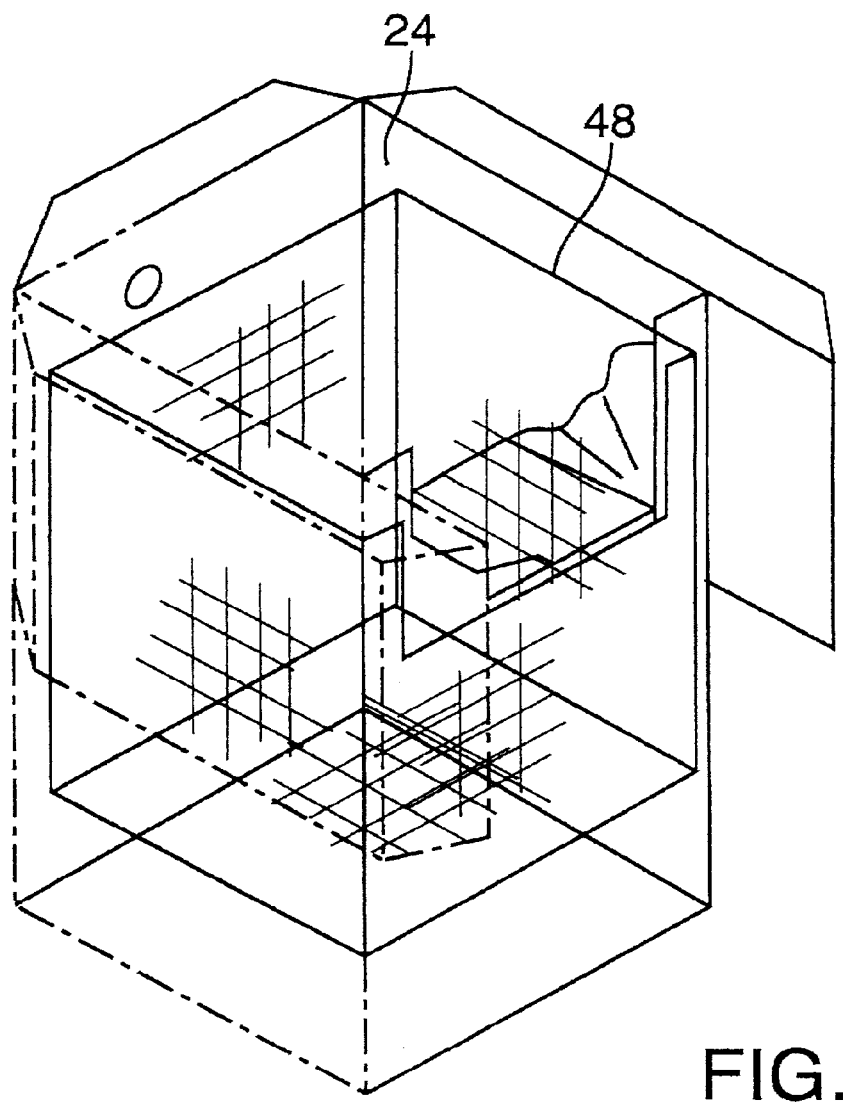
FIG. 12 is a perspective view similar to FIGS. 10 and 11, showing the use of an internal debris basket in the skimmer.

FIG. 12 illustrates the placement of the internal debris basket 48 in relation to the central cavity 26. The debris basket 48 retains smaller debris (cigarette butts, bits of wood, etc.) In the confines of the basket, yet allows passage of oil or other lighter materials to the oil offload conduit 51.

Figure 13:
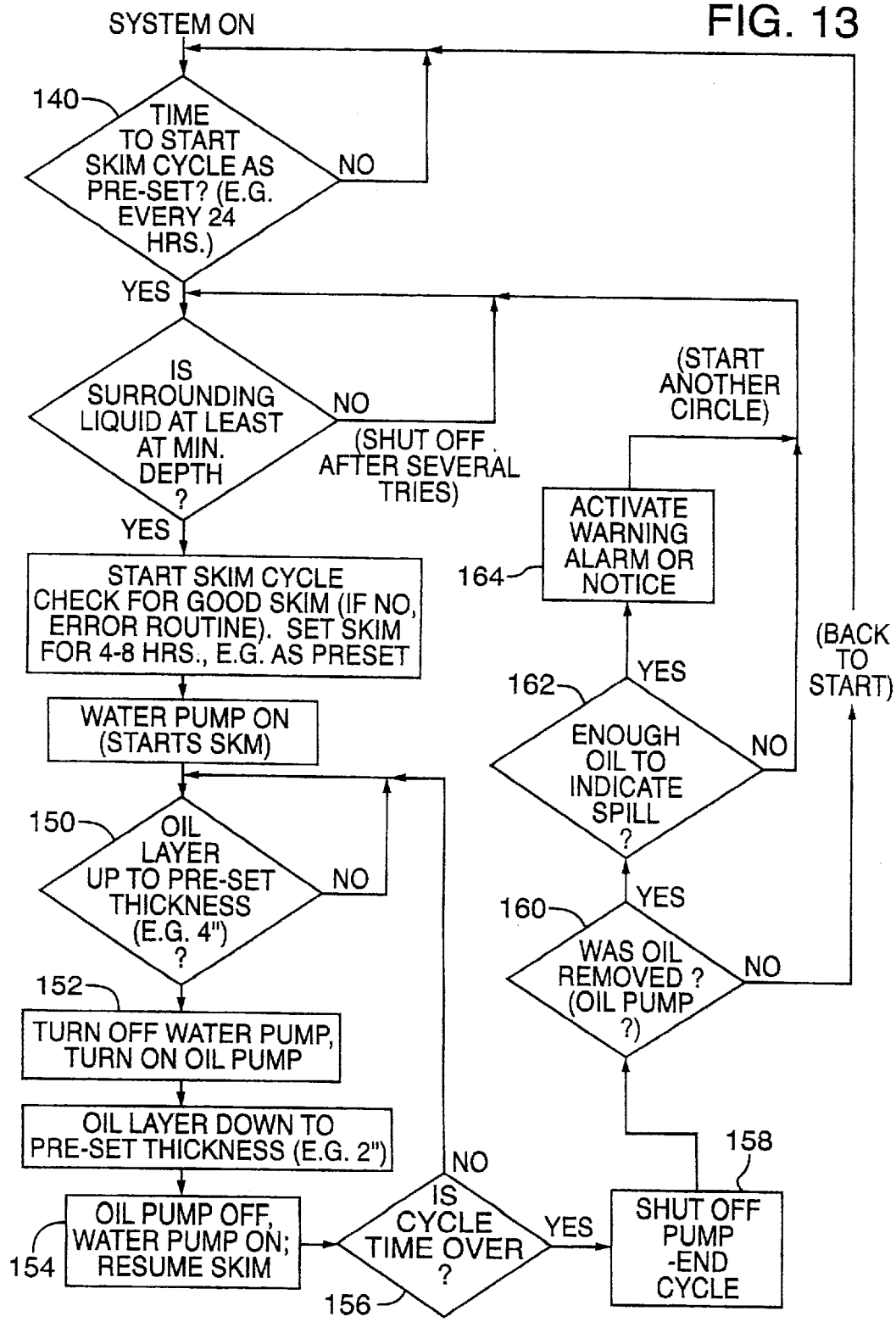
FIG. 13 is a simple flow chart indicating automatic operation of the system of the invention.

FIG. 13 is a flow chart outlining operation of the skimmer system. With the system turned on, a first decision block 140 indicates that the system looks for a preset time to start a skim cycle, such as every 24 hours. The system could be started according to another parameter, such as a liquid level, if desired.

If the time is arrived to start the cycle, it is determined whether the surrounding liquid, in the body of liquid in which the skimmer resides, has at least a predetermined minimum depth. If not, the system is shut off and this query is made again after a predetermined shut-off period. If after several tries there is not sufficient liquid in the body of water, the system is shut off, preferably with an alarm or notice activated.

Assuming the surrounding liquid is at sufficient minimum depth, a skim cycle is started. This involves switching on the water pump to start the skim. In a preferred operating procedure the system then checks for a good skim after about one minute. This is done by determining whether the skimmer rises in the surrounding body of water within such a period; if not, the system goes into an error routine. If the skim is confirmed, it is set for a preset period such as four to eight hours.

As in the decision block 150, the system then looks for an oil layer of a predetermined thickness, for example about four inches, on top of the water within the sump. When this occurs, the system turns off the water pump and turns on the oil pump, as indicated at 152. When the oil layer reaches a preset lesser thickness, the system turns off the oil pump and resumes the skim by turning the water pump back on, as at 154. When the cycle time is over, as at 156, the system shuts off the skim as indicated at 158.

After each skim cycle, the system preferably determines whether oil was in fact removed during that skim cycle, as indicated in the decision block 160. If not, there was not sufficient oil present, and the system returns to the start position. If oil was removed, the system preferably proceeds to the decision block 162, inquiring whether the oil pump was on long enough during the cycle to indicate an oil spill was being collected. If not, the system returns to start another cycle, as indicated. If an oil spill is indicated, the system activates a warning alarm or notice as indicated at 164, and again, another cycle is started because oil was in fact removed and it is assumed there might be more oil to remove.

Figure 14:
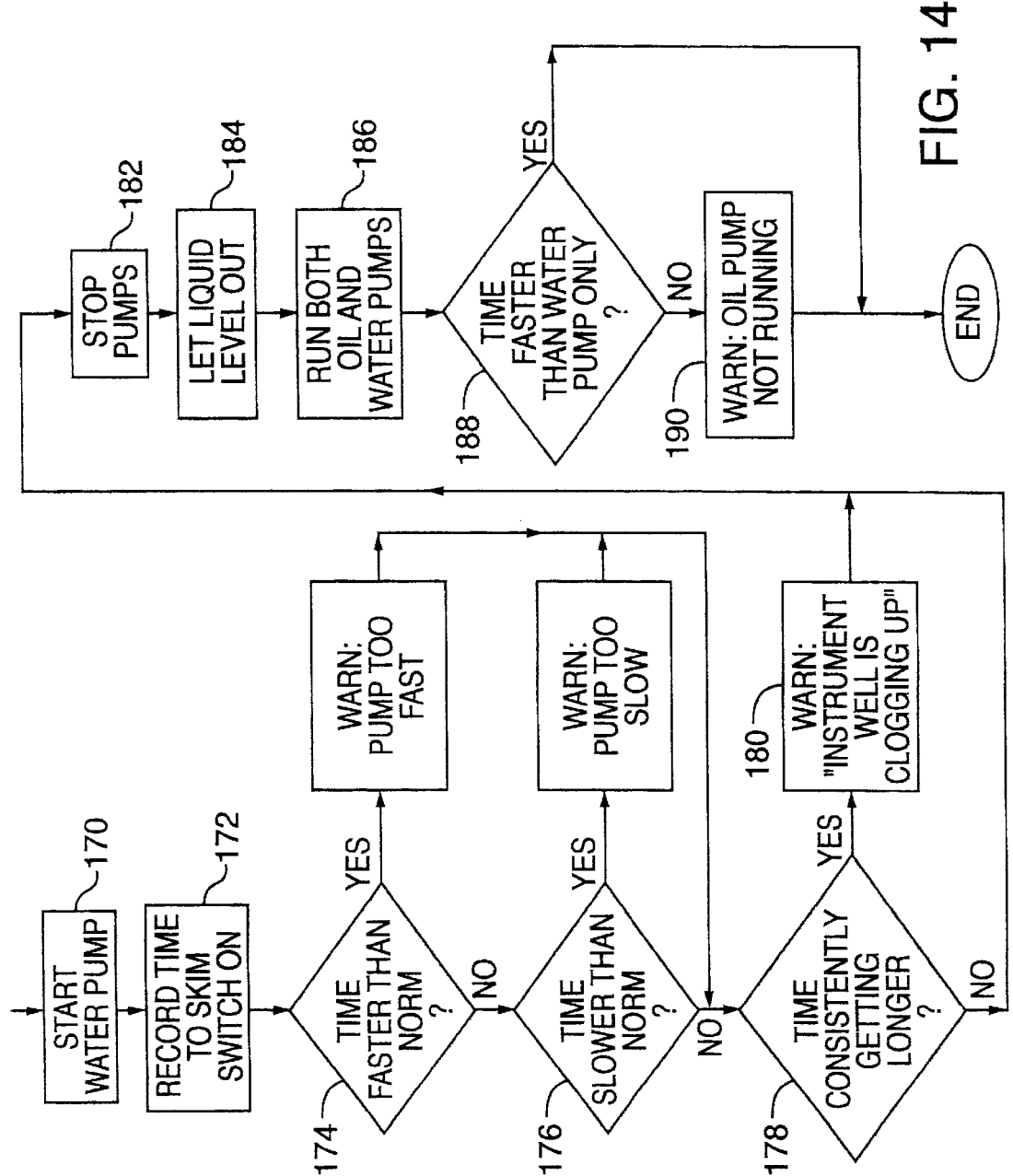
FIG. 14 is a simple flow chart indicating a maintenance cycle for the system, within which the system is checked for proper operation.

FIG. 14 indicates schematically a maintenance routine of the system. In the example routine indicated, the water pump is started as noted at 170, and the system records the duration of time before the skim switch is turned on, i.e. before a sensor is activated showing that the skimmer body has risen in the surrounding liquid to the point that a skim is indicated as occurring. This is noted in the block 172. If this time is faster than a system-stored "normal" time, as noted in decision block 174, then a warning is activated that the pump is operating too fast. If the time is slower than a system-stored normal time, as at 176, then again a warning is activated.

The system also consults stored information and detects whether, over a period of time during which such tests are conducted, the time required to reach skim is consistently becoming longer, as indicated at 178. If so, a warning is activated, as at 180, to the effect that the instrument well (FIG. 4) is becoming clogged.

When this procedure is completed, the system stops the pumps as indicated at 182. The liquid is allowed to level out as at 184, i.e. water flows back into the sump through the venturi, and equilibrium is reached. Then, the system runs both the oil and water pumps simultaneously, as noted at 186. It is then determined whether the sump becomes evacuated to a certain degree faster with both pumps on, as compared to only the water pump being on, as noted at 188. If so, this indicates proper operation, since the two pumps operating together should evacuate liquid faster than only one. If not, a warning 190 is activated, indicating that the oil pump is not running.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A skimmer system for removing a layer of oil or other petroleum derivative from the surface of water, comprising:
    a skimmer capable of floating in a body of water which may contain petroleum derivatives, the skimmer including a skimmer body with a liquid entrance, a buoyancy float on the skimmer body for providing permanent buoyancy for the skimmer, a sump within the skimmer body for receiving skimmed liquid taken into the skimmer through the liquid entrance from the body of water, and a floating, articulated weir positioned at the liquid entrance to the skimmer and positioned to float on the surface of the liquid within the skimmer sump, when such liquid is present,
    control means remote from the skimmer for receiving signals from the skimmer as to the status of the skimmer and liquid levels within the skimmer, and for controlling operations of the skimmer with in the body of water, and including a communication line between the skimmer and the control means,
    water pumping means for withdrawing water from the skimmer, from a position near a bottom of the sump, when signaled to do so by the control means,
    oil pumping means for withdrawing petroleum derivative from the skimmer, from an upper position in the sump near the surface of liquid normally maintained within the sump during a skimming operation, when signaled to do so by the control means,
    oil layer sensing means within the skimmer, for determining depth of a layer of petroleum derivative, if any, floating on the surface of water within the sump,
    the control means including skimmer activating means for switching on the water pumping means to withdraw water from the sump, causing liquid from the body of water to enter the skimmer and to be skimmed over the floating weir, whenever it is determined by the control means that a skim should be activated, and for maintaining a skim by withdrawal of water from the skimmer sump when input signals from the skimmer indicate appropriate status of the skimmer, and
    oil pump control means within the control means, for activating the oil pumping means to pump petroleum derivative out of the skimmer sump when the depth of petroleum derivative floating on the water is at least a first predetermined depth as determined by said oil layer sensing means, and for continuing the oil pumping means until the depth of oil within the sump reaches a second and lesser predetermined depth.

2. The system of claim 1, further including oil removal detection means within the control means for determining after a skim cycle whether oil was removed from the skimmer during the cycle, and if so, for beginning another skim cycle.

3. The system of claim 1, wherein the skimmer includes sump sensor means for determining the level of liquid within the sump, and wherein the control means includes means for determining, after the water pumping means has been switched on and a predetermined period of time has passed, whether the sump level has dropped to a preselected lower level, and if not, for switching off the water pumping means for a preselected dormant period, then again switching on the water pumping means.

4. The system of claim 1, wherein the water pumping means is connected to discharge sump water out of the skimmer and into the body of water.

5. The system of claim 4, wherein the water pumping means comprises a venturi pump with a venturi opening within the sump and exposed to water in the sump, and with an outlet discharging to the body of water, and including means for taking up water from the body of water and directing it through the venturi pump so as to pull sump water out of the sump and remove it to the body of water.

6. The system of claim 5, wherein the venturi pump is without check valves, so that water from the body of water is permitted to enter the sump when the water pumping means is switched off, thus allowing the skimmer to sink to some extent within the body of water whenever skimming via the water pumping means is discontinued.

7. The system of claim 1, further including cycle terminating means within the control means, for switching off the water pumping means when the control means determines that a skimming cycle is completed.

8. The system of claim 1, further including means within the control means for preventing activation of a skimmer cycle when the body of water is not at a preselected minimum depth.

9. The system of claim 1, further including means in the control means for shutting off the water pumping means when the oil pumping means is activated.

10. The system of claim 1, wherein the water pumping means comprises a venturi pump with an outlet to the body of water and with a venturi inlet open to water within the sump, and including means remote from the skimmer for drawing water from the body of water and directing it through the venturi pump so as to pull water from the sump as the water exits back into the body of water.

11. The system of claim 10, wherein the venturi pump is without check valves, so that water from the body of water is permitted to enter the sump when the water pumping means is switched off, thus allowing the skimmer to sink to some extent within the body of water whenever skimming via the water pumping means is discontinued.

12. The system of claim 1, further including a debris screen secured to the skimmer body and positioned to intercept large pieces of debris, preventing the debris from entering the skimmer.

13. The system of claim 1, further including a removable debris basket within the skimmer body, for catching small items of debris.

14. The system of claim 1, wherein the floating weir of the skimmer has a flexible skirt extending between sides of the weir and the skimmer body surrounding the liquid entrance, so as to prevent liquid from entering the skimmer except over the weir.

15. The system of claim 1, wherein the skimmer body includes a baffle positioned at the sump liquid surface when a skim is in progress, for slowing the flow of liquid as it enters the skimmer.

16. The system of claim 1, wherein the oil layer sensing means includes a float having specific gravity selected to be greater than that of oil and less than that of water, so that the float will rest within the oil and essentially at the surface of the water.

17. The system of claim 1, wherein the buoyancy float on the skimmer body comprises a flotation tank.

18. The system of claim 1, further including means within the control means for determining whether a predetermined amount of oil was removed during a skim cycle, so as to indicate an oil spill and for activating an alarm in the event of such oil spill detection.

19. The system of claim 1, in combination with a basin positioned to catch runoff water and petroleum derivitives, the water in said basin serving as said body of water.

20. A method for automatically removing oil or other petroleum derivatives from the surface of water, comprising:

providing a skimmer capable of floating a body of water which is subjected to drainage of oil from time to time into the body of water, and placing the skimmer in the body of water, the skimmer having a skimmer body with a liquid entrance, a buoyancy float for providing permanent buoyancy for the skimmer, a sump within the skimmer body for receiving skimmed liquid taken into the skimmer through the liquid entrance from the body of water, and a floating, articulated weir positioned at the liquid entrance so as to float on the surface of the liquid within the skimmer sump, and also including a water pump for withdrawing water from a low position within the liquid sump and an oil pump for withdrawing oil from an upper position within the liquid sump, near the surface of liquid within the sump, providing an automatic control means remote from the skimmer for receiving inputs from the skimmer as to status of the skimmer and liquid levels within the skimmer, and for controlling operations of the skimmer within the body of water, including providing a communication line between the skimmer and the control means, automatically switching on the water pump and withdrawing water from the skimmer sump, under a predetermined program of operation, via the automatic control means, thus commencing a skim cycle, causing the skimmer body to rise upwardly in the body of water due to withdrawal of liquid from the sump and causing the weir to be positioned so that liquid from the body enters the liquid entrance to the skimmer and flows over the weir and into the sump, sensing liquid levels within the skimmer, via level sensors within the skimmer body, and communicating data concerning the liquid levels to the automatic control means, confirming via the liquid level data that a skim has commenced, determining via the automatic control means and the liquid level data when a layer of oil at the top of the liquid in the sump reaches a predetermined thickness, and then activating the oil pump via the control means to pump oil out of the skimmer sump, until the oil layer within the sump reaches a second and lesser predetermined thickness.

21. The method of claim 20, including switching off the water pump when the oil pump is active, and recommencing pumping with the water pump when the oil pump is turned off, when the oil layer reaches said second, lesser predetermined thickness.

22. The method of claim 20, wherein the body of water comprises water within a basin positioned to receive water and petroleum derivitives.

* * * * *